UNITED STATES PATENT OFFICE.

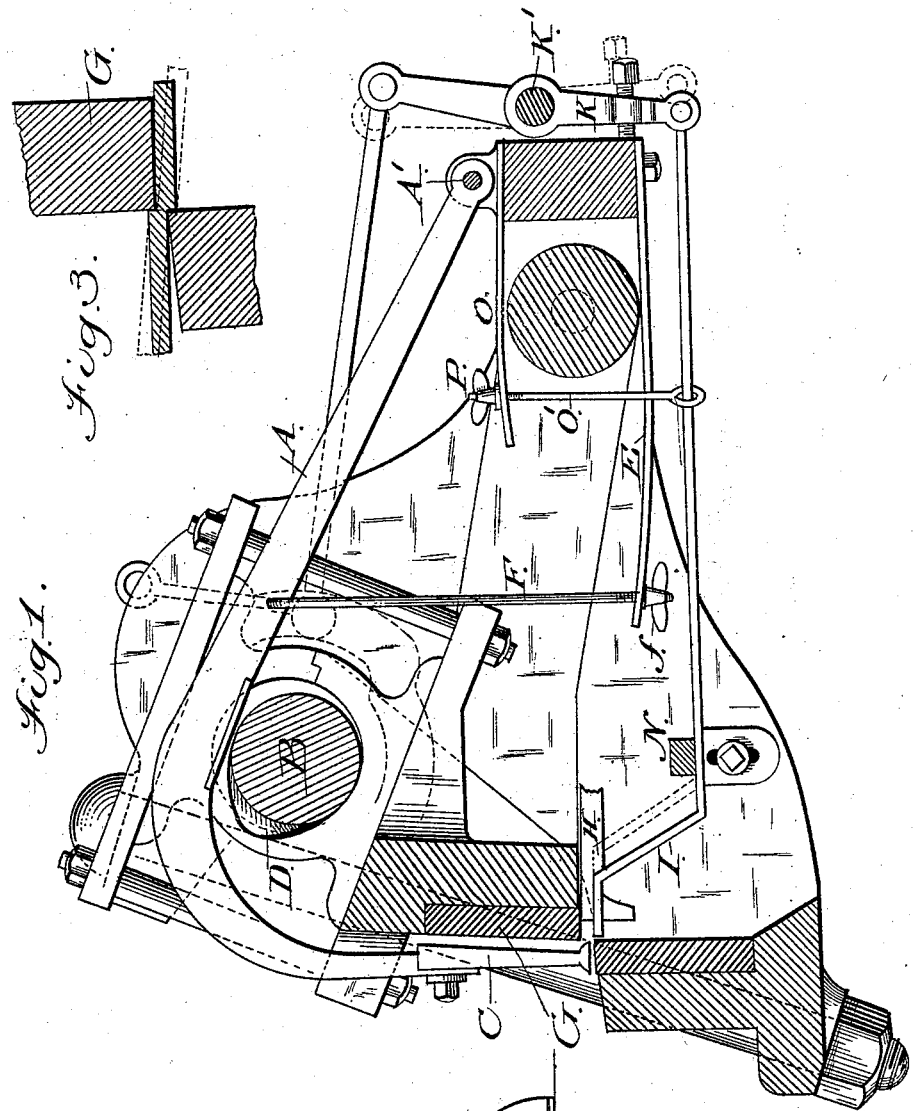

HARVEY B. CHESS, OF PITTSBURG, PENNSYLVANIA.

SHEARING-MACHINE.

SPECIFICATION forming part of Letters Patent No. 294,966, dated March 11, 1884.

Application filed November 2, 1883. (No model.)

*To all whom it may concern:*

Be it known that I, HARVEY B. CHESS, of Pittsburg, in the county of Allegheny and State of Pennsylvania, have invented a new and useful Improvement in Shears for Cutting Sheet Metal, of which the following is a full, clear, and exact description, reference being had to the accompanying drawings, making a part of this specification, in which—

Figure 1 represents a longitudinal vertical section of a pair of shears with my improvements attached. Fig. 2 is a front elevation of the clamping device. Fig. 3 are details to be referred to.

My present invention relates, particularly, to means for clamping and supporting the metal plates while being cut; and it consists in the combination of devices hereinafter explained and claimed.

To enable others skilled in the art to make and use my invention, I will proceed to describe the exact manner in which I have carried it out.

While shearing sheet metal it is quite essential to clamp down the portion from which the strip is to be cut. I accomplish this by means of the arms A, which are pivoted in the rear of the machine at A', and which are extended over the shaft B and to the front in a single piece. On the front end of the arm I attach the pressers or clamps C, as shown in Fig. 2, which are raised by the means of cams D on the shaft B. The downward movement of the clamps is brought about by the adjustable springs E, attached to the arm A by the rod F and thumb-screws *f*. In each downward stroke of the cutting-knife G the clamps C move down slightly in advance of the knife, and, reaching the material first, clamp it down firmly with the spring-pressure, which may be regulated by the thumb-screw *f*. On the return or upward movement of the knife these clamps also travel upward, but in such relation that the feet of the clamps keep below the edge of the upper knife, which facilitates the entering of the sheet or plate when "buckled" or out of true plane, as it prevents the possibility of the plate catching or impinging on the edge of the knife. The clamps C are so swiveled or centrally attached to the arm A in relation to the point of contact with the plate that their final movement in clamping the plate is inward or toward the gages H, thus holding the metal against the gages properly for cutting. When particularly soft metal is being acted on by such shears, the lack of support and the contact with the descending knife causes the piece or strip to be bent downward at the front edge. The "shear" is always used, and this giving way or bending downward commences at the first moment of the contact with the knife, and, as it continues during or throughout the shear cut, the result is the production of a spiral strip frequently of great distortion. To prevent this and to aid in securing a squareness of the cut, I attach a series of "rest" fingers I underneath the cutting or moving knife, which come to the front when the knife moves down to its work, as shown in Fig. 1. These fingers are connected to arms K on a rock-shaft, K', extending across the rear of the bed, which in turn is operated through an arm-link from a cam on the main shaft. As the fingers I are moved to the front their limit of rising is controlled by an adjustable stop-bar, N, extending across and over them all. These fingers are thus kept from rising above the common plane on which the plate enters the machine, while they are supported in an upward direction by the springs O and vertical rods O', and adjusted by the thumb-screws P.

The action is as follows: The metal is entered at the opening between the knives as far as the gages H will permit. The knife in its descent commences to cut off the strip, but each finger in succession does its share in sustaining (by means of its spring-support) each portion of the strip being cut off, and when the severing has been completed the fingers are all drawn backward by the arms on the rock-shaft sufficiently far to allow the strip to drop down and out of the machine. The clearing of the strip from the fingers is accomplished by the gages H holding the strip in place during the backward movement of the fingers. The strip having dropped, the cam, rock-shaft, and arms move the fingers again to their forward position, where they constitute a movable table for the support of the entering sheet. Fig. 3 shows the effect of the cut on the strip with my improvements attached.

It is evident that the clamps C may be attached vertically to move with a knife rising and falling vertically.

Having thus described my invention, what I claim to be new, and desire to secure by Letters Patent, is—

1. In shears for cutting sheet metal, the fingers I, with suitable mechanism for operating the same, the adjustable stop N, and adjustable spring O, in combination with the knife G and gages H, substantially as and for the purpose set forth.

2. In shears for cutting sheet metal, the knives G G' and gages H, in combination with the clamps C and fingers I, all constructed to operate substantially as and for the purpose set forth.

HARVEY B. CHESS.

Witnesses:
WM. N. EASTON,
THOMAS J. ROGERS.